(12) United States Patent
Kondo (10) Patent No.: US 8,102,454 B2
(45) Date of Patent: Jan. 24, 2012

(54) IMAGE PICKUP APPARATUS (75) Inventor: Yasushi Kondo, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 651 days.

(21) Appl. No.: 12/303,248

(22) PCT Filed: May 23, 2007

(86) PCT No.: PCT/JP2007/060520
§ 371 (c)(1),
(2), (4) Date: Dec. 2, 2008

(87) PCT Pub. No.: WO2007/142032
PCT Pub. Date: Dec. 13, 2007

(65) Prior Publication Data
US 2009/0256943 A1    Oct. 15, 2009

(30) Foreign Application Priority Data

Jun. 8, 2006    (JP) .................... 2006-159894

(51) Int. Cl.
H04N 5/335    (2006.01)
(52) U.S. Cl. ........ 348/311; 348/294; 348/298; 348/302; 348/303; 348/315; 348/316; 348/317; 348/319; 348/340
(58) Field of Classification Search .......... 348/294, 348/298, 302, 303, 311, 315–317, 319, 340
See application file for complete search history.

(56) References Cited

U.S. PATENT DOCUMENTS

| | | | | |
|---|---|---|---|---|
| 4,113,353 A * | 9/1978 | Matsushita | ................ | 359/636 |
| 4,242,662 A * | 12/1980 | Tsujiyama et al. | ......... | 382/149 |
| 4,958,231 A * | 9/1990 | Tsuchiya | .................. | 348/215.1 |
| 6,265,736 B1 * | 7/2001 | Dillen et al. | ................ | 257/232 |
| 6,717,127 B2 * | 4/2004 | Kimura et al. | ............. | 250/208.1 |
| 7,080,785 B2 * | 7/2006 | Nasu | .............................. | 235/454 |
| 7,400,353 B2 * | 7/2008 | Hatano | ....................... | 348/308 |
| 7,656,455 B2 * | 2/2010 | Hatano | ....................... | 348/361 |
| 2003/0206235 A1 * | 11/2003 | Suzuki | ......................... | 348/304 |
| 2004/0195599 A1 * | 10/2004 | Nasu | ............................. | 257/292 |
| 2005/0068434 A1 * | 3/2005 | Hatano | ....................... | 348/272 |
| 2005/0088535 A1 * | 4/2005 | Hatano | ..................... | 348/220.1 |

(Continued)

FOREIGN PATENT DOCUMENTS

EP    1 796 377 A1    6/2007

(Continued)

OTHER PUBLICATIONS

International Search Report for the Application No. PCT/JP2007/060520 mailed Aug. 7, 2007.

(Continued)

Primary Examiner — Evelyn A. Lester
(74) Attorney, Agent, or Firm — Cheng Law Group, PLLC (57) ABSTRACT An image converter tube 2c and a plurality of image sensors CCDs 1 (eight CCDs 1 here) are provided, and the respective CCDs 1 and image positions in the image converter tube 2c are in one-to-one correspondence. By carrying out at least one of a control to make a shift to a different image position after image formation in one and the same image position for a predetermined number of frames, and a control to make a shift to a different image position in an imaging cycle with a predetermined time interval, various image pickup situations can be accommodated without changing the structure of CCDs 1 per se.

11 Claims, 8 Drawing Sheets

U.S. PATENT DOCUMENTS

| | | | |
|---|---|---|---|
| 2005/0088555 A1* | 4/2005 | Kanai | 348/308 |
| 2005/0093982 A1 | 5/2005 | Kuroki | |
| 2005/0270393 A1* | 12/2005 | Noda et al. | 348/308 |
| 2005/0270401 A1* | 12/2005 | Hatano | 348/335 |

FOREIGN PATENT DOCUMENTS

| | | |
|---|---|---|
| GB | 2 240 018 A | 7/1991 |
| JP | 03-210812 A | 9/1991 |
| JP | 11-225288 A | 8/1999 |
| JP | 2002-517966 A | 6/2002 |
| JP | 2004-328379 A | 11/2004 |
| WO | WO-99/64911 A1 | 12/1999 |
| WO | WO-2006/033322 A1 | 3/2006 |

OTHER PUBLICATIONS

Supplementary European Search Report for the Application No. EP 07 74 3954 dated Jul. 2, 2010.

\* cited by examiner

IMAGE PICKUP APPARATUS

TECHNICAL FIELD

This invention relates to an image pickup apparatus having image sensors for picking up images by converting incident light into electric charges to generate signal charges corresponding to the intensity of the light.

BACKGROUND ART

Figure 2:
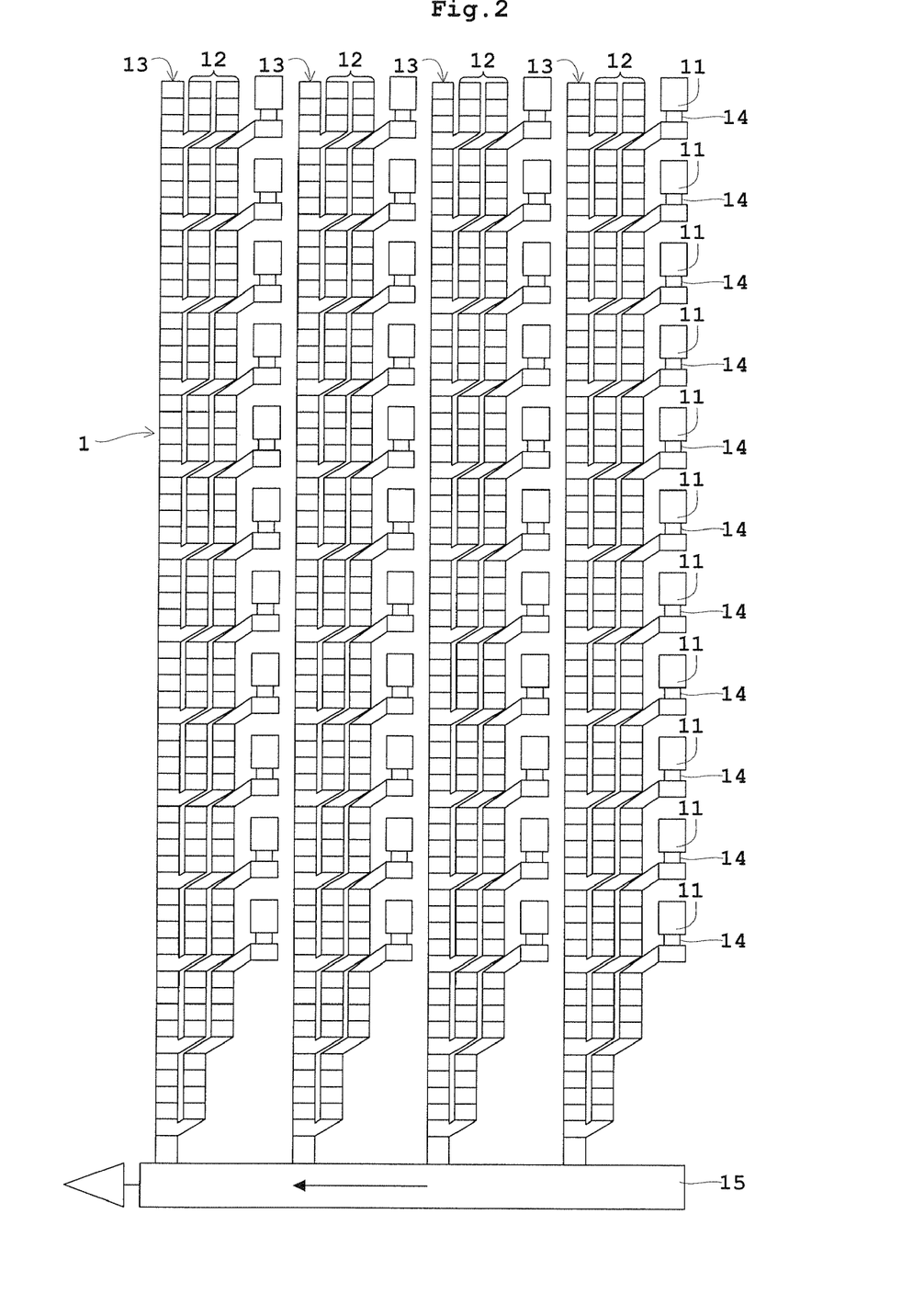
FIG. 2 is a block diagram showing a construction of a CCD according to Embodiments 1 and 2.

As this type of image sensor, there exists a CCD (Charge Coupled Device) type solid-state image sensor, for example. In recent years, in order to enable high-speed imaging, such a CCD type solid-state image sensor (hereinafter abbreviated as "CCD") has, arranged adjacent photoelectric converters (e.g. photodiodes) that convert incident light into electric charges to generates signal charges corresponding to the intensity of the light, a plurality of charge storage units (e.g. storage CCDs) for storing and memorizing the signal charges generated from the photoelectric converters (see Patent Document 1, for example). This image sensor has the photoelectric converters and charge storage units arranged on a chip. In recent years, a CCD called "in-situ storage image sensor" has been employed. This image sensor will be described with reference to FIG. 2. As shown in FIG. 2, a CCD 1 has a plurality of photodiodes 11 and storage CCDs 12 as noted above, and has vertical transfer CCDs 13 for transferring signal charges in these storage CCDs 12 in a vertical direction shown in FIG. 2. Each photodiode 11 has a read gate 14 disposed at a side thereof for reading signal charges to a storage CCD 12 adjacent thereto. In addition, horizontal transfer CCDs 15 are provided for transferring, in a horizontal direction shown in FIG. 2, signal charges transferred from the vertical transfer CCDs 13.

In this "in-situ storage image sensor", the storage CCDs 12 in line form extend in an oblique direction. By arranging in the oblique direction as above, CCD cells can be packed without leaving wasteful space on a chip.

Incidentally, an image converter tube is incorporated in the image pickup apparatus upstream of this image sensor to perform electronic shutter action and amplification (see Patent Document 2, for example). The image converter tube is also called a "streak tube", in which an input image (optical image) formed on a photoelectric surface by an optical lens is converted into an electron image, and the electron image released from the photoelectric surface is formed on an MCP (microchannel plate) by an electron lens. A deflector plate between the electron lens and MCP moves a position of the electron image, and the MCP carries out electronic shuttering and amplification. The electron image is converted into an optical image, which is picked up by a CCD.

[Patent Document 1]
Japanese Unexamined Patent Publication H11-225288 (pages 1-8, FIGS. 2-7 and 15-20)

[Patent Document 2]
Japanese Unexamined Patent Publication No. H3-210812 (pages 1 and 3-5, FIGS. 2, 6 and 7)

DISCLOSURE OF THE INVENTION

Problem to be Solved by the Invention

However, the number of CCD cells represented by storage CCDs and the like is limited because of an arrangement on a chip. Therefore, a restriction is imposed on the number of images picked up. Particularly, where an imaging cycle is as short as 1 µs as in a high-speed imaging of $1.0 \times 10^6$ frames per second (1,000,000 frames per second), for example, the imaging time becomes short, making extended imaging impossible, compared with the case where an imaging cycle is long (e.g. 1 ms or more) as in a general video rate. Where, for example, the number of storage CCDs is 100 and the imaging cycle is 1 µs, the image time is 100×1 µs/frame=100 µs. Thus, since the number of storage elements is limited, there is a problem of failing to cope with various imaging situations as represented by a restriction on imaging time. In this specification, images picked up are defined as frames, and time intervals between frames are defined as imaging cycles. The reciprocal of the imaging cycle is defined as imaging speed.

This invention has been made having regard to the state of the art noted above, and its object is to provide an imaging apparatus capable of coping with various imaging situations.

Means for Solving the Problem

To solve the above problem, Inventor has made intensive research and attained the following findings.

Attention was focused on a surrounding structure without changing the structure of the image sensor itself. Then, attention was focused on the image converter tube as in Patent Document 2 noted hereinbefore, and a different approach was made to arrange image sensors in relation to the image converter tube.

Specifically, a plurality of image sensors are provided, and the image sensors are arranged to be in a one-to-one relationship with image positions in the image converter tube. Then, it is sufficient to carry out at least one of the following controls: control (A) to make a shift to a different image position after image formation in the same image position for a predetermined number of frames, and control (B) to make a shift to a different image position in an imaging cycle with a predetermined time interval. It has been found that such controls can accommodate various image pickup situations, such as enabling an extended imaging time, without changing the structure of the image sensors per se.

Based on the above findings, this invention provides the following construction.

An image pickup apparatus of this invention is an image pickup apparatus for picking up images comprising a plurality of image sensors for picking up images by converting incident light into electric charges to generate signal charges corresponding to intensity of the light; and an image converter tube constructed to convert an optical image into an electron image, move an image position of the electron image, convert the formed electron image to an optical image again, and subsequently input the converted optical image as the incident light to the image sensors; the respective image sensors and respective image positions being in one-to-one correspondence; the image pickup apparatus further comprising a control device for carrying out at least one of control (A) to make a shift to a different one of the image positions after image formation in one of the image positions for a predetermined number of frames, and control (B) to make a shift to a different one of the image positions in an imaging cycle with a predetermined time interval.

The image pickup apparatus of this invention has an image converter tube and a plurality of image sensors. The image converter tube is constructed to convert an optical image into an electron image, move an image position of the electron image, convert the formed electron image to an optical image again, and subsequently input the converted optical image as incident light to the image sensors. The respective image sensors and image positions in the image converter tube are arranged in one-to-one correspondence. Further, a control device is provided for carrying out at least one of control (A) to make a shift to a different image position after image formation in one image position for a predetermined number of frames, and control (B) to make a shift to a different image position in an imaging cycle with a predetermined time interval. With such control device provided, when a trouble occurs with imaging by an image sensor in a certain imaging situation, a shift can be made to a different image position free from the trouble, to switch to a different image sensor in a one-to-one relationship with the image position to which the shift is made. It is possible, as a result, to accommodate various image pickup situations without changing the structure of the image sensors per se. In this specification, an imaging speed at or above 100,000 frames per second is called "high-speed imaging".

In the invention described above, as an example of carrying out at least one of controls (A) and (B), the control device may carry out control (A) only, may carry out control (B) only, or may carry out both controls (A) and (B).

In the invention described above, the image pickup apparatus, preferably, further comprises a switching device for switching between at least one of controls (A) and (B), and a control to carry out image formation in one of the image positions for a predetermined number of frames per one image sensor determined by the number of charge storage devices that accumulate and store the signal charges. The control to carry out image formation in one of the image positions for a predetermined number of frames per one image sensor determined by the number of charge storage devices that accumulate and store the signal charges is a control in what is called "ordinary imaging mode" where a single image sensor is provided. With the switching device, switching is made freely between at least one of controls (A) and (B) and the control in the ordinary imaging mode, to increase versatility with the ordinary imaging mode added to various image pickup modes.

In one example of the invention described above, as control (A), a control is repeatedly carried out for each of the image sensors corresponding one-to-one to the image positions, to make a shift to a different image position after image formation in one of the image positions for a predetermined number of frames per one image sensor determined by the number of charge storage devices that accumulate and store the signal charges. By making a shift to a different image position after image formation in one image position for the predetermined number of frames, image pickup can be carried out newly with the image sensor corresponding one-to-one to the image position to which the shift is made. Imaging can be carried out for an extended time corresponding to a multiple of the number of image sensors.

In another example of the invention described above, when the number of image sensors corresponding one-to-one to the image positions is n, a time interval between the images picked up in one of the image positions is t and an imaging cycle is t/n, as control (B), a control to make a shift to a different one of the image positions in the imaging cycle t/n is repeated for each of the image sensors (the invention set out in claim 4). By repeating the control to make a shift to a different image position in the above imaging cycle t/n, as control (B), for each of the image sensor, high-speed image pickup can be carried out with the imaging cycle shortened by an amount corresponding to 1/n where the number n of image sensors is the denominator.

In the invention described above, the image sensors have photoelectric conversion devices for converting the incident light into electric charges to generate signal charges corresponding to intensity of the light. The photoelectric conversion devices are photodiodes, for example. Where such photoelectric conversion devices are provided, the image sensors may be constructed as follows:

The image sensors are constructed as in-situ storage image sensors having a plurality of photoelectric conversion devices and charge storage devices for accumulating and storing the signal charges, the charge storage devices being connected to form lines, respectively, the signal charges generated from the photoelectric conversion devices being stored in the respective charge storage devices while transferring the signal charges successively to adjoining charge storage devices, and the charge storage devices in line form extending in an oblique direction relative to an arrangement of the photoelectric conversion devices. With this construction, the image sensors become "in-situ storage image sensors". In these in-situ storage image sensors, the charge storage devices in line form extend in an oblique direction, whereby the charge storage devices can be packed without leaving wasteful space on a chip having the photoelectric conversion devices and charge storage devices arranged thereon.

The image sensors, typically, are CCD type solid-state image sensors.

Effects of the Invention

The image pickup apparatus according to this invention has an image converter tube and a plurality of image sensors. The respective image sensors and image positions in the image converter tube are in one-to-one correspondence. A control device is provided for carrying out at least one of control (A) to make a shift to a different image position after image formation in one and the same image position for a predetermined number of frames, and control (B) to make a shift to a different image position in an imaging cycle with a predetermined time interval. Thus, various image pickup situations can be accommodated without changing the structure of the image sensors per se.

DESCRIPTION OF REFERENCES

1 . . . CCD type solid-state image sensors (CCDs)
2c . . . image converter tube
9b . . . image converter tube drive circuit
11 . . . photodiodes
12 . . . storage CCDs
13 . . . vertical transfer CCDs
T, t/n . . . imaging cycle
$P_1$-$P_8$ . . . image positions Embodiment 1

Embodiment 1 of this invention will be described hereinafter with reference to the drawings.

Figure 1:
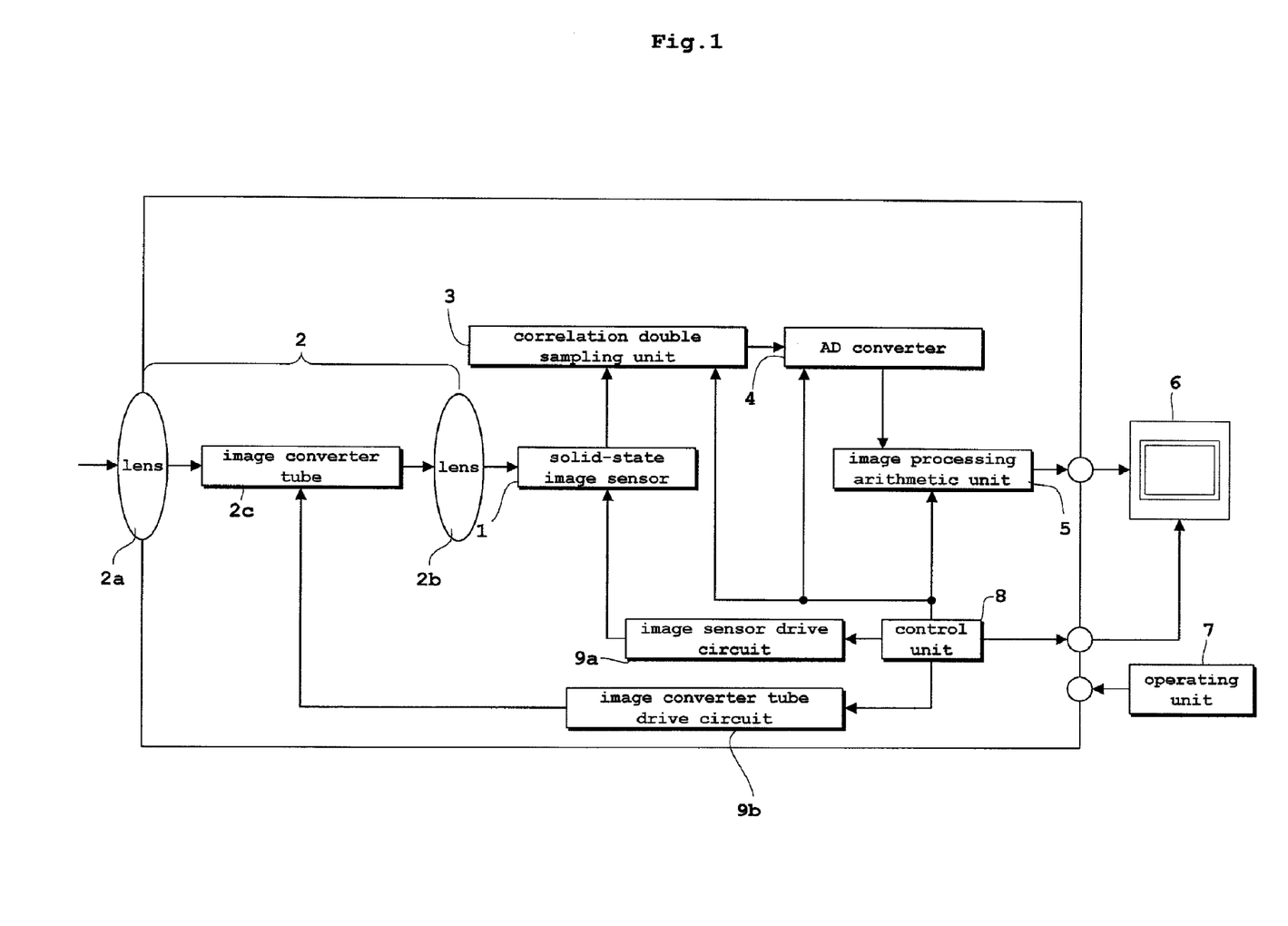
FIG. 1 is a block diagram showing an outline of an image pickup apparatus using CCD type solid-state image sensors (CCDs) according to Embodiments 1 and 2.
Figure 3:
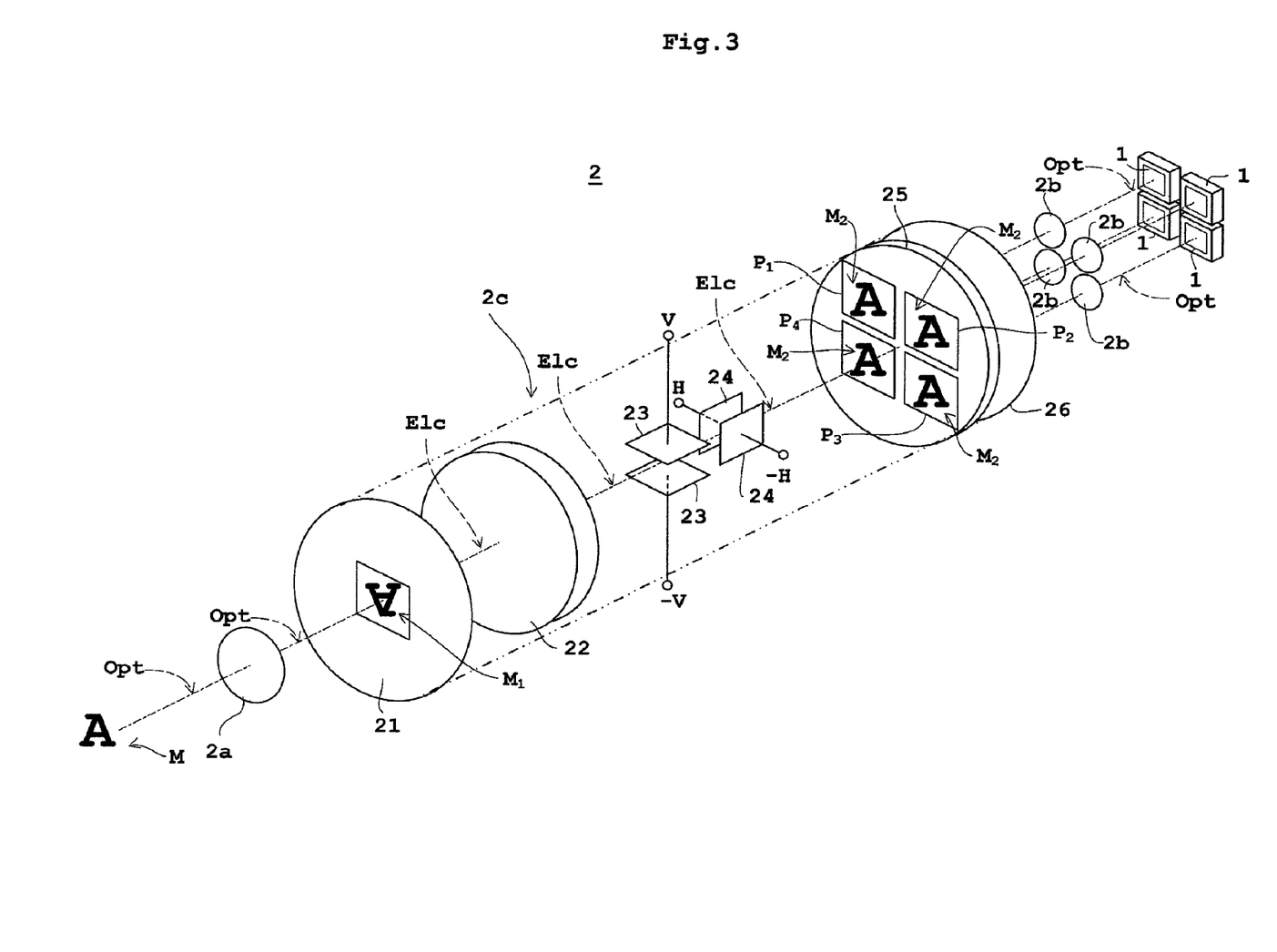
FIG. 3 is a perspective view schematically showing an interior of an optical system including an image converter tube according to Embodiments 1 and 2.
Figure 4:
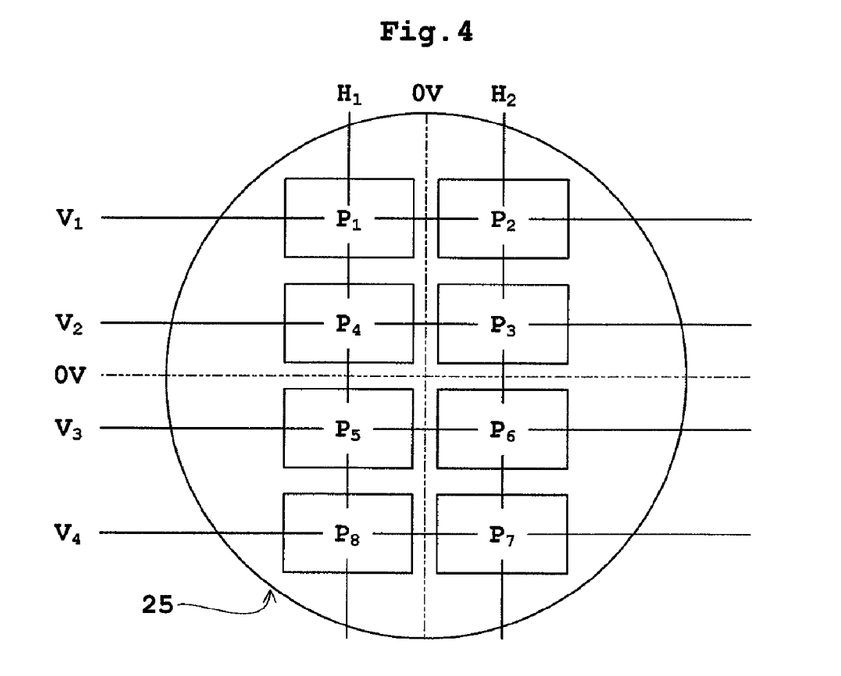
FIG. 4 is a schematic view showing a relationship between image positions of a microchannel plate (MCP) and vertical/horizontal position control voltages according to Embodiments 1 and 2.
Figure 5:
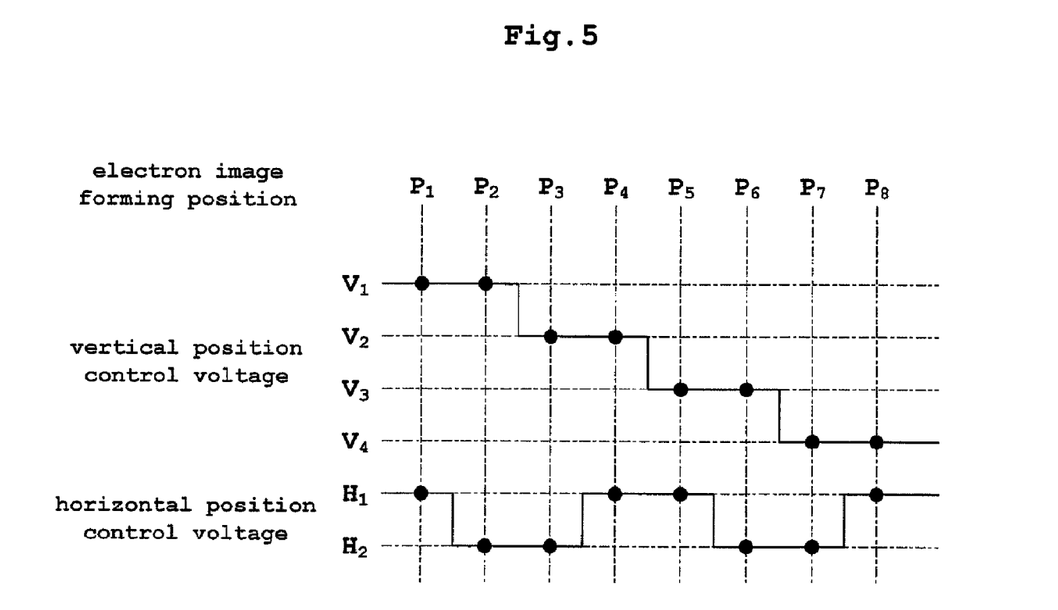
FIG. 5 is a timing chart showing the relationship between image positions of the microchannel plate (MCP) and vertical/horizontal position control voltages according to Embodiments 1 and 2.

FIG. 1 is a block diagram showing an outline of an image pickup apparatus using CCD type solid-state image sensors (CCDs) according to Embodiment 1 and Embodiment 2 described hereinafter. FIG. 2 is a block diagram showing a construction of a CCD according to Embodiments 1 and 2. FIG. 3 is a perspective view schematically showing an interior of an optical system including an image converter tube according to Embodiments 1 and 2. FIG. 4 is a schematic view showing a relationship between imaging positions of a microchannel plate (MCP) and vertical/horizontal position control voltages according to Embodiments 1 and 2. FIG. 5 is a timing chart showing the relationship between imaging positions of the microchannel plate (MCP) and vertical/horizontal position control voltages according to Embodiments 1 and 2. As will be clear from the reason described hereinafter, Embodiment 1 relates to an example of control (A) in this invention.

The image pickup apparatus according to Embodiment, including Embodiment 2 described hereinafter, is constructed to acquire optical images of an object, convert the acquired optical images into signal charges and into electric signals, thereby picking up images of the object. Specifically, as shown in FIG. 1, the image pickup apparatus includes solid-state image sensors (CCDs) 1, and includes an optical system 2, a correlation double sampling unit 3, an AD converter 4, an image processing arithmetic unit 5, a monitor 6, an operating unit 7 and a control unit 8. Further, the image pickup apparatus includes an image sensor drive circuit 9a and an image converter tube drive circuit 9b. This image pickup apparatus is used for a high-speed image pickup with an imaging speed at $1.0 \times 10^6$ frames per second (1,000,000 frames per second). The solid-state image sensors (CCDs) 1 correspond to the image sensors in this invention.

The optical system 2 has two lenses 2a and 2b and an image converter tube 2c. The lens 2a located adjacent the object takes in optical images of the object. The image converter tube 2c, which is also called "streak tube", converts the optical images taken in by the lens 2a into electron images, and converts them into optical images after carrying out electronic shuttering and amplification. The lens 2b located downstream of the image converter tube 2c takes in the optical images outputted from the image converter tube 2c. The image converter tube 2c corresponds to the image converter tube in this invention.

The correlation double sampling unit 3 amplifies signal charges from the CCDs 1 to low noise, and converts them into electric signals for output. The AD converter 4 converts the electric signals into digital signals. The image processing arithmetic unit 5 performs various types of arithmetic processing to create two-dimensional images of the object based on the electric signals digitized by the AD converter 4. The monitor 6 outputs the two-dimensional images on a screen.

The operating unit 7 performs various operations required for execution of imaging. The control unit 8 carries out an overall control of the entire apparatus according to controls such as photographing conditions set by the operating unit 7.

To drive the interior of CCDs 1, the image sensor drive circuit 9a applies voltage to read gates 14 (see FIG. 2) described hereinafter, and to transfer electrodes which transfer signal charges in the CCDs 1, and generates timing of voltage application, timing of image pickup and clock (clock frequency in FIG. 4). To drive the interior of image converter tube 2c, the image converter tube drive circuit 9b applies a vertical position control voltage (see FIGS. 4 and 5) to vertical deflector plates 23 (see FIG. 3) described hereinafter, and a horizontal position control voltage (see FIGS. 4 and 5) to horizontal deflection plates 24 (see FIG. 3) described hereinafter, and generates timing of applying the above vertical position control voltage and horizontal position control voltage in synchronism with the clock from the image sensor drive circuit 9a. The image converter tube drive circuit 9b corresponds to the control device in this invention.

Next, as shown in FIG. 2, a CCD 1 includes photodiodes 11 for converting incident light (optical images of an object) into electric charges to generate signal charges corresponding to the intensity of the light, a plurality of storage CCDs 12 for storing and memorizing the signal charges generated from the photodiodes 11, and vertical transfer CCDs 13 for transferring the signal charges in these storage CCDs 12 in a vertical direction shown in FIG. 2. The photodiodes 11 correspond to the photoelectric conversion devices in this invention. The storage CCDs 12 and vertical transfer CCDs 13 correspond to the charge storage devices in this invention.

Each photodiode 11 has a read gate 14 disposed at a side thereof. Each read gate 14 reads signal charges from this photodiode 11 into a storage CCD 12 adjacent thereto.

The storage CCDs 12 are connected to form lines, respectively, and a plurality of lines of storage CCDs 12 are arranged. The signal charges generated from the photodiodes 11 are stored in the respective storage CCDs 12 while transferring them successively to the adjoining storage CCDs 12. The signal charges successively transferred from the storage CCDs 12 are joined to the vertical transfer CCDs 13. The signal charges transferred from the vertical transfer CCDs 13 are transferred to horizontal transfer CCDs 15.

The photodiodes 11 are arranged two-dimensionally. Since the photodiodes 11 are arranged horizontally and vertically parallel, the storage CCDs 12 in line form extend in an oblique direction. The CCDs 1 according to Embodiment 1, including Embodiment 2 described hereinafter, are what is called "in-situ storage image sensors". The entire construction of CCDs 1 is the same as in the prior art.

The image pickup apparatus according to Embodiment 1, including Embodiment 2 described hereinafter, has eight CCDs 1. For expediency of illustration, FIG. 3 shows only four CCDs 1, and also only four imaging positions corresponding one-to-one thereto. As shown in FIG. 3, the image converter tube 2c of the optical system 2 has a photoelectric surface 21, an electron lens 22, vertical deflector plates 23, horizontal deflector plates 24, a microchannel plate (MCP) 25 and a phosphor screen 26 arranged in order from adjacent an object M.

The image converter tube 2c converts an optical image $M_1$ of the object M taken in through the lens 2a into an electron image $M_2$. Specifically, an optical image $M_1$ (input image) formed on the photoelectric surface 21 by the lens 2a is converted into an electron image $M_2$ on the photoelectric surface 21. The electron image $M_2$ released from the photoelectric surface 21 is formed on the MCP 25 by the electron lens 22. Before the image formation on the MCP 25, the vertical deflector plates 23 and horizontal deflector plates 24 move the image position P of the electron image $M_2$ to $P_1$, $P_2$, $P_3$, $P_4$, $P_5$, $P_6$, $P_7$ or $P_8$ (only $P_1$-$P_4$ being shown in FIG. 3). The electron image $M_2$ formed on the MCP 25 is again converted into an optical image on the phosphor screen 26. The converted optical image is inputted as incident light Opt to the CCDs 1 through the lens 2b.

The respective CCDs 1 and respective image positions $P_1$-$P_8$ are arranged in a one-to-one correspondence (only four CCDs 1 being shown in FIG. 3). The vertical deflector plates 23 are in the form of two electrodes for vertically deflecting the electron image $M_2$, the vertical deflection being carried out by applying vertical position control voltages to the vertical deflector plates 23. The horizontal deflector plates 24 are in the form of two electrodes for horizontally deflecting the electron image $M_2$, the horizontal deflection being carried out by applying horizontal position control voltages to the horizontal deflector plates 24.

FIG. 4 shows each of the image positions $P_1$-$P_8$, vertical position control voltages $V_1$, $V_2$, $V_3$ and $V_4$, and horizontal position control voltages $H_1$ and $H_2$. The electron image $M_2$ is formed on a central portion of MCP 25 when no voltage is applied to the vertical deflector plates 23 (see FIG. 3) or horizontal deflection plates 24 (see FIG. 3) (that is, the vertical position control voltage and horizontal position control voltage are both 0V). It is therefore preferable to set the vertical position control voltages to $V_1=-V_4$ and $V_2=-V_3$, and set the horizontal position control voltages to $H_1=-H_2$. In the sense of control, it is also preferable that the image positions are arranged at equal intervals both in the vertical direction and in the horizontal direction. It is therefore preferable to set $V_1-V_2=V_2-V_3=V_3-V_4$. To summarize the above, it is preferable to set $V_1=3\times V_2=-V_4=-3\times V_3$. For example, $V_1=1500V$, $V_2=H_1=500V$, $V_3=H_2=-500V$ and $V_4=-1500V$ are set.

When the image converter tube drive circuit 9b (see FIG. 1) switches the vertical position control voltages $V_1$-$V_4$ and horizontal position control voltages $H_1$ and $H_2$ for application to and control of the vertical/horizontal deflector plates 23 and 24 (see FIG. 3) at timing as shown in FIG. 5, the image position of electron image $M_2$ moves according to the magnitude of voltages applied. With the vertical position control voltage increasing from $V_2$ to $V_1$, image formation occurs in positions more remote from the central portion of MCP 25 (upward in the drawing of FIG. 4). With the vertical position control voltage increasing in negative value from $V_3$ to $V_4$, image formation occurs in positions more remote from the central portion of MCP 25 (downward in the drawing of FIG. 4). With the vertical position control voltage at $H_1$, image formation occurs in positions on the left-hand side of the central portion of MCP 25 in the drawing of FIG. 4. With the vertical position control voltage at $H_2$, image formation occurs in positions on the right-hand side of the central portion of MCP 25 in the drawing of FIG. 4.

As shown in FIGS. 4 and 5, the image position is $P_1$ when the vertical control voltage is $V_1$ and the horizontal control voltage is $H_1$, the image position is $P_2$ when the vertical control voltage is $V_1$ and the horizontal control voltage is $H_2$, the image position is $P_3$ when the vertical control voltage is $V_2$ and the horizontal control voltage is $H_2$, the image position is $P_4$ when the vertical control voltage is $V_2$ and the horizontal control voltage is $H_1$, the image position is $P_5$ when the vertical control voltage is $V_3$ and the horizontal control voltage is $H_1$, the image position is $P_6$ when the vertical control voltage is $V_3$ and the horizontal control voltage is $H_2$, the image position is $P_7$ when the vertical control voltage is $V_4$ and the horizontal control voltage is $H_2$, and the image position is $P_8$ when the vertical control voltage is $V_4$ and the horizontal control voltage is $H_1$. Thus, in the case of the timing chart shown in FIG. 5, the image position moves successively in the order of $P_1 \to P_2 \to P_3 \to P_4 \to P_5 \to P_6 \to P_7 \to P_8$.

Figure 6:
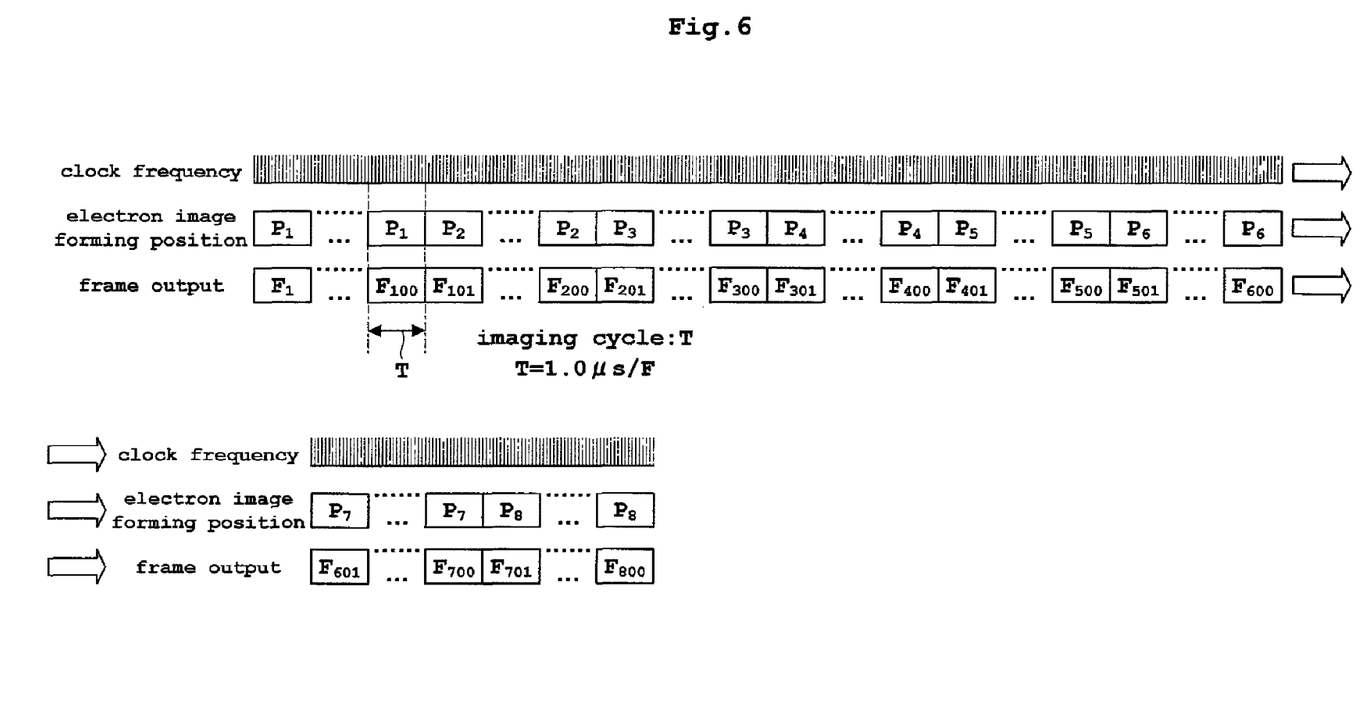
FIG. 6 is a timing chart of image positions of an electron image and frame outputs according to Embodiment 1.

Next, time series variations of the image positions and frame outputs in Embodiment 1 will be described with reference to FIG. 6. FIG. 6 is a timing chart of imaging positions of an electron image and frame outputs according to Embodiment 1.

It is assumed that, in Embodiment 1, imaging speed is $1.0 \times 10^6$ frames per second (1,000,000 frames per second), that is, imaging cycle T is 1 μs per frame (1 μs/F in FIG. 6). The number of image frames per CCD 1 is 100, which is determined by a total of CCD cells of the storage CCDs 12 and vertical transfer CCDs 13. Therefore, one CCD 1 continuously carries out image pickup for 100 frames in each imaging cycle T. The following description assumes that the clock frequency outputted from the image sensor drive circuit 9a (see FIG. 1) is 16 MHz (which may be converted into cycles as 1 μs/16=0.0625 μs=62.5 ns), and that the imaging cycle T, image positions of the electron image and frame outputs synchronize with the clock frequency. In FIG. 6, subscript x of the frame outputs $F_x$ indicates frame numbers. For example, $F_1$ indicates a first frame, and $F_{100}$ indicates a 100th frame.

As shown in FIG. 6, a shift is made to a different image position after forming the image in one and the same image position for 100 frames which is the number of image frames per CCD 1 determined by the total of CCD cells of the storage CCDs 12 and vertical transfer CCDs 13. Such control is repeatedly carried out for each of the CCDs 1 corresponding one-to-one to the image positions. In FIG. 6, as noted above, the image position is moved in the order of $P_1 \to P_2 \to P_3 \to P_4 \to P_5 \to P_6 \to P_7 \to P_8$. Thus, after image formation in the same image position $P_1$ for 100 frames, for a CCD 1 to pick up the image for 100 frames (see $F_1$-$F_{100}$ in FIG. 6), a shift is made to the next image position $P_2$. After image formation in the same image position $P_2$ for 100 frames, for a CCD 1 to pick up the image for 100 frames (see $F_{101}$-$F_{200}$ in FIG. 6), a shift is made to the next image position $P_3$.

Similarly, after image formation in the same image position $P_3$ for 100 frames, for a CCD 1 to pick up the image for 100 frames (see $F_{201}$-$F_{300}$ in FIG. 6), a shift is made to the next image position $P_4$. After image formation in the same image position $P_4$ for 100 frames, for a CCD 1 to pick up the image for 100 frames (see $F_{301}$-$F_{400}$ in FIG. 6), a shift is made to the next image position $P_5$. Similarly, after image formation in the same image position $P_5$ for 100 frames, for a CCD 1 to pick up the image for 100 frames (see $F_{401}$-$F_{500}$ in FIG. 6), a shift is made to the next image position $P_6$. After image formation in the same image position $P_6$ for 100 frames, for a CCD 1 to pick up the image for 100 frames (see $F_{501}$-$F_{600}$ in FIG. 6), a shift is made to the next image position $P_7$. Similarly, after image formation in the same image position $P_7$ for 100 frames, for a CCD 1 to pick up the image for 100 frames (see $F_{601}$-$F_{700}$ in FIG. 6), a shift is made to the next image position $P_8$. The image is formed in the same image position $P_8$ for 100 frames, for a CCD 1 to pick up the image for 100 frames (see $F_{701}$-$F_{800}$ in FIG. 6).

The above image pickup apparatus has the image converter tube 2c and the plurality of CCDs 1 (eight CCDs 1 here). The image converter tube 2c is constructed to convert an optical image into an electron image, move the image position of the electron image, convert the electron image formed into an optical image again, and thereafter input the converted optical image as incident light to the CCDs 1. The respective CCDs 1 and the image positions in the image converter tube 2c are in the one-to-one correspondence (image positions $P_1$-$P_8$ here). The image converter tube drive circuit 9b is provided for carrying out control (A) to make a shift to a different image position after forming the image in one and the same image position for a predetermined number of frames (here, 100 frames which is the number of image frames per CCD 1 determined by the total of CCD cells of the storage CCDs 12 and vertical transfer CCDs 13). With such image converter tube drive circuit 9b provided, when a trouble occurs with imaging by a CCD 1 in a certain image pickup situation, a shift can be made to a different image position free from the trouble, to switch to a different CCD 1 in a one-to-one relationship with the image position to which the shift is made. It is possible, as a result, to accommodate various image pickup situations without changing the structure of CCDs 1 per se.

In Embodiment 1, as control (A), the control is repeatedly carried out for each of the CCDs 1 corresponding one-to-one to the image positions, to make a shift to a different image position after forming an image in one and the same image position for 100 frames which is the number of image frames per CCD 1 determined by the total of CCD cells of the storage CCDs 12 and vertical transfer CCDs 13. By making a shift to a different image position after image formation in one and the same image position for 100 frames, as noted above, the image can be picked up newly by the CCD1 which is in a one-to-one relationship with the image position to which the shift is made. Imaging can be carried out for a long time corresponding to a multiple of (eight times here) the number (eight here) of CCDs 1.

Embodiment 2

Embodiment 2 of this invention will be described hereinafter with reference to the drawings.

Figure 7:
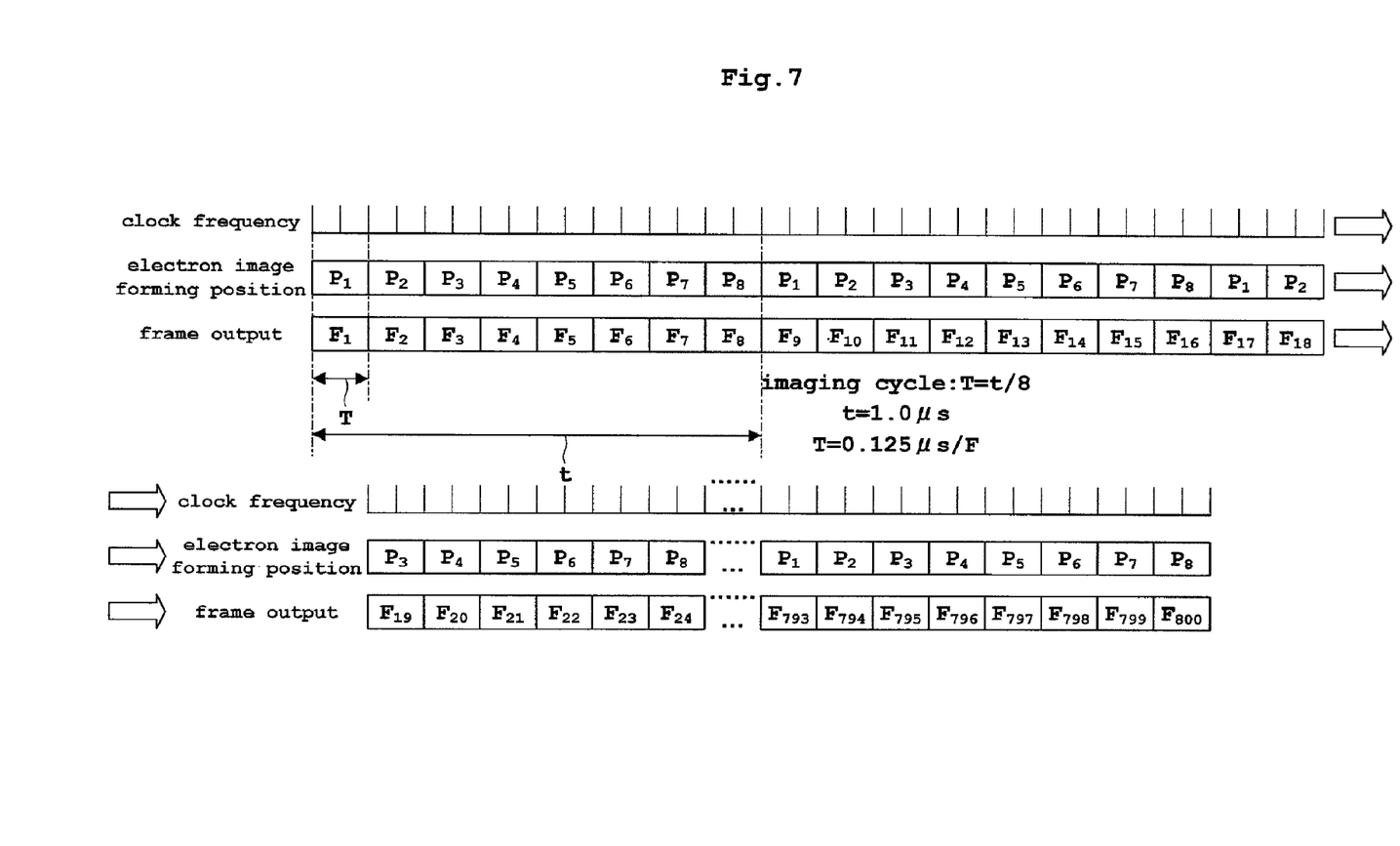
FIG. 7 is a timing chart of image positions of an electron image and frame outputs according to Embodiment 2.

FIG. 7 is a timing chart of image positions of an electron image and frame outputs according to Embodiment 2. The image pickup apparatus and the optical system including the CCDs and image converter tube have the same construction as in Embodiment 1, as shown in FIGS. 1-5. Time series variations of the image positions and frame outputs in Embodiment 2 will be described with reference to FIG. 7. As will be clear from the reason described hereinafter, Embodiment 2 relates to an example of control (B) in this invention.

In Embodiment 2, when the number of CCDs 1 corresponding one-to-one to the image positions is n, a time interval between the images picked up in one and the same image position is t and an imaging cycle T is t/n, a control to make a shift to a different image position in the imaging cycle T (=t/n) is repeated for each CCD 1. The number n of CCDs 1 is eight as in Embodiment 1, and the number of image frames per CCD 1 determined by the total of CCD cells of the storage CCDs 12 and vertical transfer CCDs 13 is 100 as in Embodiment 1. Thus, during the imaging cycle T, image pickup for one frame by one CCD 1 is repeated a number of times corresponding to the number n (=eight) of CCDs 1. The following description assumes that the clock frequency outputted from the image sensor drive circuit 9a (see FIG. 1) is 16 MHz as in Embodiment 1, and that the imaging cycle T, image positions of the electron image and frame outputs synchronize with the clock frequency.

When the time interval t between the images picked up by the same CCD 1 is set to 1 μs which is the same time interval as imaging cycle T in Embodiment 1, since n=8, one eighth of the time interval t becomes the imaging cycle T. Therefore, the imaging cycle T=t/n=t/8=1 μs/8=0.125 μs.

As shown in FIG. 7, the control to make a shift to a different image position in the imaging cycle T (=t/n=0.125 μs) is repeated for each CCD 1. In FIG. 7, the image position is moved in the order of $P_1 \rightarrow P_2 \rightarrow P_3 \rightarrow P_4 \rightarrow P_5 \rightarrow P_6 \rightarrow P_7 \rightarrow P_8$ as in Embodiment 1. Therefore, during the imaging cycle T (=t/n=0.125 μs), image pickup for one frame by one CCD 1 is repeatedly carried out as follows.

First, image pickup for one frame is carried out by the CCD 1 corresponding one-to-one to the image position $P_1$ until the imaging time reaches 0.125 μs (=t/n×1) (see $F_1$ in FIG. 7). A shift is made from the image position $P_1$ to the next image position $P_2$. Image pickup for one frame is carried out by the CCD 1 corresponding one-to-one to the image position $P_2$ until the imaging time reaches 0.250 μs (=t/n×2) (see $F_2$ in FIG. 7). A shift is made from the image formation position $P_2$ to the next image position $P_3$.

Similarly, image pickup for one frame is carried out by the CCD 1 corresponding one-to-one to the image position $P_3$ until the imaging time reaches 0.375 μs (=t/n×3) (see $F_3$ in FIG. 7). A shift is made from the image position $P_3$ to the next image position $P_4$. Image pickup for one frame is carried out by the CCD 1 corresponding one-to-one to the image position $P_4$ until the imaging time reaches 0.500 μs (=t/n×4) (see $F_4$ in FIG. 7). A shift is made from the image formation position $P_4$ to the next image position $P_5$. Similarly, image pickup for one frame is carried out by the CCD 1 corresponding one-to-one to the image position $P_5$ until the imaging time reaches 0.625 μs (=t/n×5) (see $F_5$ in FIG. 7). A shift is made from the image position $P_5$ to the next image position $P_6$. Image pickup for one frame is carried out by the CCD 1 corresponding one-to-one to the image position $P_6$ until the imaging time reaches 0.750 μs (=t/n×6) (see $F_6$ in FIG. 7). A shift is made from the image formation position $P_6$ to the next image position $P_7$. Similarly, image pickup for one frame is carried out by the CCD 1 corresponding one-to-one to the image position $P_7$ until the imaging time reaches 0.875 μs (=t/n×7) (see $F_7$ in FIG. 7). A shift is made from the image formation position $P_7$ to the next image position $P_8$. Image pickup for one frame is carried out by the CCD 1 corresponding one-to-one to the image position $P_8$ until the imaging time reaches 1.000 μs (=t/n×8) (see $F_8$ in FIG. 7). In this way, image pickup for one frame is carried out by one CCD 1 during the imaging cycle T (=t/n=0.125 μs).

The above image pickup apparatus, as in Embodiment 1, has the image converter tube 2c and the plurality of CCDs 1 (eight CCDs 1 here). The respective CCDs 1 and the image positions in the image converter tube 2c are in the one-to-one correspondence (image positions $P_1$-$P_8$ here). The image converter tube drive circuit 9b is provided for carrying out control (B) to make a shift to a different image position in the imaging cycle (T=t/n here) with a predetermined time interval. With such image converter tube drive circuit 9b provided, when a trouble occurs with imaging by a CCD 1 in a certain imaging situation, a shift can be made to a different image position free from the trouble, to switch to a different CCD 1 in a one-to-one relationship with the image position to which the shift is made. It is possible, as a result, to accommodate various image pickup situations without changing the structure of CCDs 1 per se.

In Embodiment 2, as control (B), the control is repeatedly carried out for each of the CCDs 1 corresponding one-to-one to the image positions, to make a shift to a different image position in the imaging cycle t/n (n=8 here). By making a shift to a different image position in the imaging cycle t/n, as noted above, high-speed image pickup can be carried out with the imaging cycle T shortened by an amount corresponding to 1/n (1/8 here) where the number n (n=2 here) of CCDs 1 is the denominator.

This invention is not limited to the foregoing embodiments, but may be modified as follows:

(1) The foregoing embodiments have been described, taking for example a high-speed image pickup with an imaging speed at or above 1,000,000 frames per second. However, the invention may be applied to an ordinary image pickup with an imaging speed below 1,000,000 frames per second.

(2) The foregoing embodiments have been described, taking photodiodes as an example of photoelectric converting function for converting incident light into electric charges to generate signals corresponding to the intensity of the light. However, photogates may be used instead.

(3) The foregoing embodiments have been described taking the "in-situ storage image sensor" with slanted CCDs for example. This invention is applicable also to an image sensor having storage CCDs in line form extending vertically, or to a storage device having storage CCDs in matrix form.

(4) In each of the foregoing embodiments, the number of CCDs is eight. However, the number is not limited to eight, as long as it is a plurality which correspond one-to-one to the image positions. Therefore, image sensors represented by the CCDs may be provided according to the number of image positions in the image converter tube.

Figure 8:
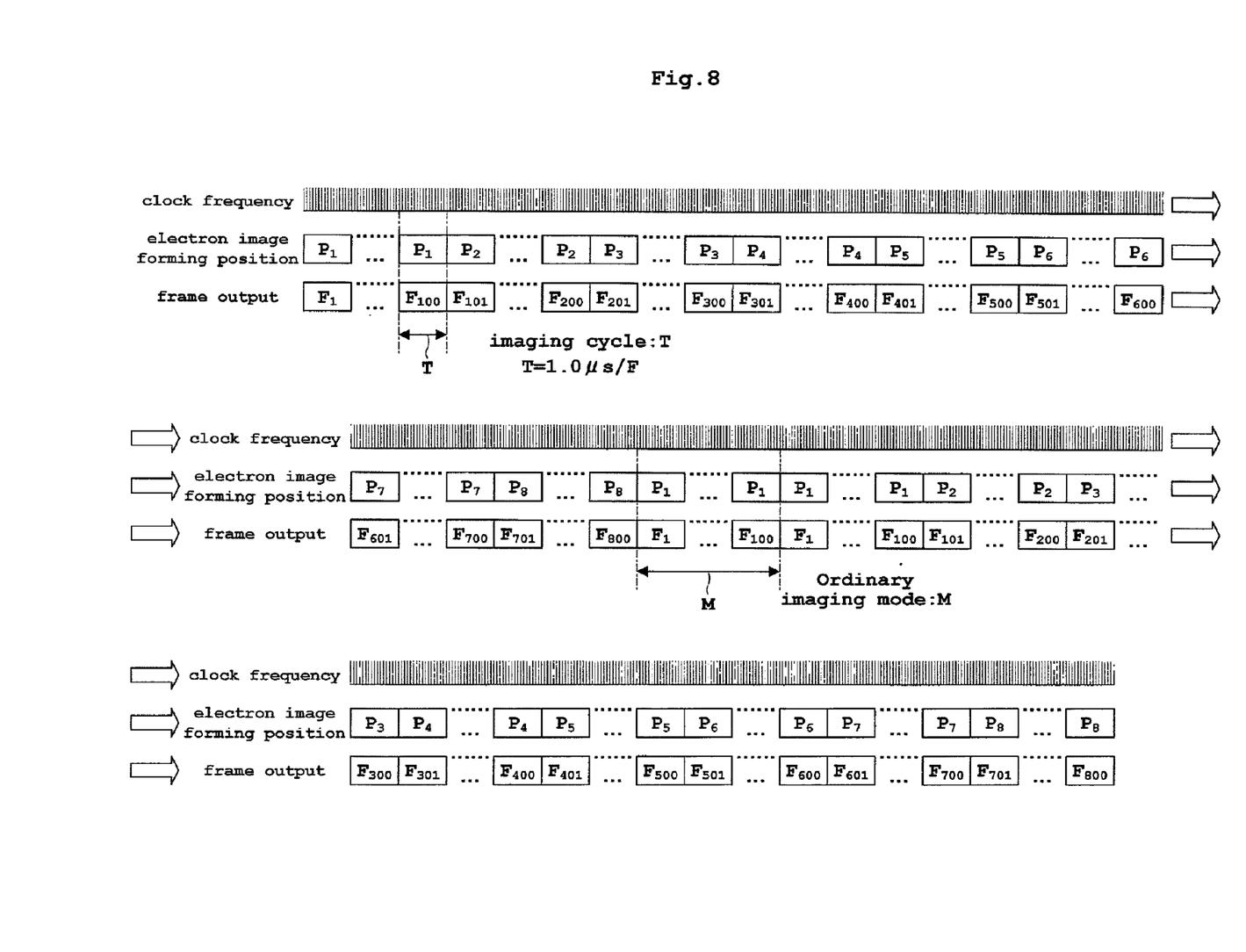
FIG. 8 is a timing chart combining Embodiment 1 and an ordinary imaging mode.
Figure 9:
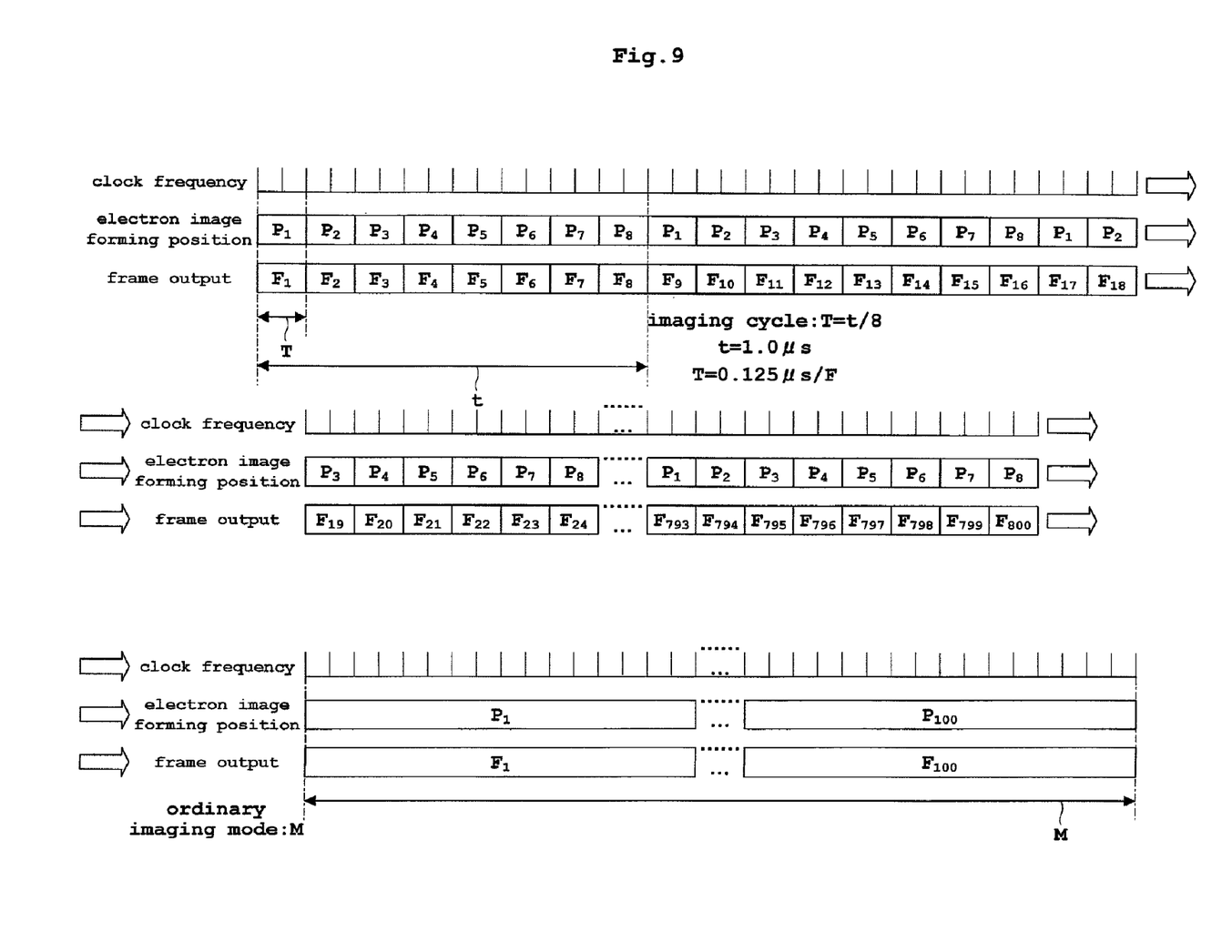
FIG. 9 is a timing chart combining Embodiment 2 and an ordinary imaging mode

(5) Each of the foregoing embodiments does not carry out a control for forming an image in one and the same image position for a predetermined number of frames (100 frames in each embodiment) per image sensor (CCD 1 in each embodiment) which is determined by the total of charge storage devices (the storage CCDs 12 and vertical transfer CCDs 13 in each embodiment), that is a control in an "ordinary imaging mode" in the case of providing a single image sensor (CCD 1 in each embodiment). A switching device may be provided for switching the controls (that is, at least one of the controls (A) and (B)) in each embodiment and a control in the ordinary imaging mode. In this case, the image converter tube drive circuit 9b may perform the function of the switching device. FIG. 8 is a timing chart combining Embodiment 1 and an ordinary imaging mode. FIG. 9 is a timing chart combining Embodiment 2 and an ordinary imaging mode. In FIGS. 8 and 9, the ordinary imaging mode is shown as M. In both of FIGS. 8 and 9, the imaging cycle T in the ordinary imaging mode is 1 μs/frame. With such switching device, switching is made freely between the controls in each embodiment and the control in the ordinary imaging mode, to increase versatility with the ordinary imaging mode added to various image pickup modes.

(6) In Embodiment 1 described hereinbefore, as control (A), a control is repeatedly carried out for each of the image sensors (CCDs 1 in each embodiment) corresponding one-to-one to the image positions, to make a shift to a different image position after forming an image in one and the same image position for a predetermined number of frames per image sensor (CCD 1 in each embodiment) determined by the total of charge storage devices (storage CCDs 12 and vertical transfer CCDs 13 in each embodiment). However, the control need not be repeatedly carried out for each of the image sensors (CCDs 1 in each embodiment). The predetermined number of frames need not be the number of frames per image sensor (CCD 1 in each embodiment) determined by the number of charge storage devices. Where, for example, the number of CCDs is eight and the number of frames per CCD 1 which is determined by the total of storage CCDs 12 and vertical transfer CCDs 13 is 100, a control may be carried out for only one CCD 1 only once, to make a shift to a different image position after forming an image in one and the same image position for a predetermined number of frames less than 100 (e.g. 50). A control may be carried out for each of the CCDs 1 by freely setting a predetermined number of frames to each CCD 1 (e.g. 100 frames to the CCD corresponding one-to-one to the image position $P_1$, 80 frames to the CCD corresponding one-to-one to the image position $P_2$, and so on). To summarize the above, the invention is not limited to specific control (A) as long as control (A) is carried out to make a shift to a different image position after image formation in the same image position for a predetermined number of frames.

(7) In Embodiment 2 described hereinbefore, as control (B), a control is repeatedly carried out for each of the CCDs 1 to make a shift to a different image position in the imaging cycle t/n. However, the control need not be repeatedly carried out for each of the CCDs 1. It is not absolutely necessary to set the imaging cycle to t/n according to the number of CCDs. Where, for example, the number of CCDs is eight, a control may be carried out for only one CCD 1 only once, to make a shift to a different image position in an imaging cycle t. To summarize the above, the invention is not limited to specific control (B) as long as control (B) is carried out to make a shift to a different image position in an imaging cycle with a predetermined time interval.

(8) The above modifications (6) and (7) may be combined. That is, switching can be made between control (A) to make a shift to a different image position after forming an electron image in one and the same image position for a predetermined number of frames, and control (B) to make a shift to a different image position in an imaging cycle with a predetermined time interval. One of the two controls (A) and (B) may be selected, or both controls (A) and (B) may be selected.

(9) This invention is applicable also to any imaging mode. Imaging modes include mainly IL (Interline) mode, FT (Frame Transfer) mode, FFT (Full Frame Transfer) mode and FIT (Frame Interline Transfer) mode. The construction of the image sensors also is variable according to these modes.

The invention claimed is:

1. An image pickup apparatus for picking up images comprising a plurality of image sensors for picking up images by converting incident light into electric charges to generate signal charges corresponding to intensity of the light; and an image converter tube constructed to convert an optical image into an electron image, move an image position of the electron image, convert the formed electron image to an optical image again, and subsequently input the converted optical image as the incident light to the image sensors; the respective image sensors and respective image positions being in one-to-one correspondence; the image pickup apparatus further comprising a control device for carrying out at least one of control (A) to make a shift to a different one of the image positions after image formation in one of the image positions for a predetermined number of frames, and control (B) to make a shift to a different one of the image positions in an imaging cycle with a predetermined time interval.

2. The image pickup apparatus according to claim 1, wherein the control device is arranged to carry out control (A) only.

3. The image pickup apparatus according to claim 1, wherein the control device is arranged to carry out control (B) only.

4. The image pickup apparatus according to claim 1, wherein the control device is arranged to carry out both controls (A) and (B).

5. The image pickup apparatus according to claims 1, further comprising a switching device for switching between at least one of controls (A) and (B), and a control to carry out image formation in one of the image positions for a predetermined number of frames per one image sensor determined by the number of charge storage devices that accumulate and store the signal charges.

6. The image pickup apparatus according to claim 1, wherein, as control (A), a control is repeatedly carried out for each of the image sensors corresponding one-to-one to the image positions, to make a shift to a different image position after image formation in one of the image positions for a predetermined number of frames per one image sensor determined by the number of charge storage devices that accumulate and store the signal charges.

7. The image pickup apparatus according to claim 1, wherein, when the number of image sensors corresponding one-to-one to the image positions is n, a time interval between the images picked up in one of the image positions is t and an imaging cycle is t/n, as control (B), a control to make a shift to a different one of the image positions in the imaging cycle t/n is repeated for each of the image sensors.

8. The image pickup apparatus according to claim 1, wherein the image sensors have photoelectric conversion devices for converting the incident light into electric charges to generate signal charges corresponding to intensity of the light.

9. The image pickup apparatus according to claim 8, wherein the photoelectric conversion devices are photodiodes.

10. The image pickup apparatus according to claim 8, wherein the image sensors are constructed as in-situ storage image sensors having a plurality of photoelectric conversion devices and charge storage devices for accumulating and storing the signal charges, the charge storage devices being connected to form lines, respectively, the signal charges generated from the photoelectric conversion devices being stored in the respective charge storage devices while transferring the signal charges successively to adjoining charge storage devices, and the charge storage devices in line form extending in an oblique direction relative to an arrangement of the photoelectric conversion devices.

11. The image pickup apparatus according to claims 1, wherein the image sensors are CCD type solid-state image sensors.

* * * * *